US007072022B2

(12) United States Patent
Beggiao

(10) Patent No.: US 7,072,022 B2
(45) Date of Patent: Jul. 4, 2006

(54) AUTOMATIC PROCESSING OF PHOTOGRAPHS IN A PHOTOGRAPHIC LABORATORY

(75) Inventor: Vanni Leopoldo Beggiao, Padua (IT)

(73) Assignee: Systel International S.p.A., Martellago (IT)

(*) Notice: Subject to any disclaimer, the term of this patent is extended or adjusted under 35 U.S.C. 154(b) by 1167 days.

(21) Appl. No.: 09/773,589

(22) Filed: Feb. 2, 2001

(65) Prior Publication Data

US 2001/0027405 A1 Oct. 4, 2001

(30) Foreign Application Priority Data

Feb. 3, 2000 (EP) .................................. 00102348
Apr. 7, 2000 (EP) .................................. 00107134

(51) Int. Cl.
*G03B 27/42* (2006.01)

(52) U.S. Cl. ............................ 355/40; 355/41; 355/77; 396/567; 396/569

(58) Field of Classification Search ............ 355/27–29, 355/40, 41, 77; 134/64 P, 122 P; 705/7, 705/8

See application file for complete search history.

(56) References Cited

U.S. PATENT DOCUMENTS

| | | | | |
|---|---|---|---|---|
| 5,159,385 | A | 10/1992 | Imamura | |
| 5,798,820 | A * | 8/1998 | Kraft et al. | 355/40 |
| 5,799,219 | A | 8/1998 | Moghadam et al. | |
| 2001/0019422 | A1* | 9/2001 | Hara | 358/1.15 |

FOREIGN PATENT DOCUMENTS

| | | | |
|---|---|---|---|
| DE | 41 10 642 | A1 | 10/1992 |
| DE | 3527584 | * | 2/1997 |
| EP | 0 628 851 | A1 | 12/1994 |

OTHER PUBLICATIONS

European Search Report dated Apr. 20, 2001.

* cited by examiner

*Primary Examiner*—D. Rutledge
(74) *Attorney, Agent, or Firm*—Buchanan Ingersoll PC

(57) ABSTRACT

Method of processing photographs in a photographic laboratory by means of a photographic processing system, comprising the steps of:
receiving customer orders and processing information respectively assigned to said customer orders, each customer order comprising at least one photographic image, controlling the processing of a customer order in accordance with an assigned processing information; checking each processing information to ascertain whether or not the processing information may be automatically processed by said processing system and identifying those customer orders which are to be processed according to a non-automatically processable processing information.

17 Claims, 6 Drawing Sheets

AUTOMATIC PROCESSING OF PHOTOGRAPHS IN A PHOTOGRAPHIC LABORATORY

CROSS REFERENCE TO RELATED APPLICATIONS

This application claims the benefit of European Patent Applications No. 00 102 348.0, filed Feb. 3, 2000, and No. 00 107 134.9, filed Apr. 7, 2000. The disclosures of these applications are hereby incorporated by reference in their entirety.

FIELD OF THE INVENTION

The present invention relates to a method for processing photographs in a photographic laboratory. The present invention further relates to a processing system for processing photographs, a program which performs the method of the invention and a computer program product comprising the program for accomplish the method of the invention.

BACKGROUND OF THE INVENTION

Conventionally, a photographer photographs pictures (images) by means of a camera. In this way he captures image information and stores the image information on a suitable storing medium, e.g. on a film in conventional cameras or on a digital memory device (e.g. floppy disk) in digital cameras. The photographer then brings the storage medium (e.g. film) to a photo shop (peripheral organisation) At a photo shop the storing mediums (e g. films in film cartridges, electronic memory units of digital cameras, etc.) of several customers are collected and processing information are added concerning the particular processing wishes of the customers (e.g. the for of the photographic prints, type of photographic paper, number of prints per picture (image), adding of a CD with digitalised pictures etc.) Furthermore, the name of the customer is noted and usually an individual order number is assigned to a so-called order or customer order which comprises, for example, a work envelope with an inserted film cartridge and the working instructions or processing information. Moreover, the photo shop may add particular requests to the processing information, e.g. the request to add one or more particular promotions to the work envelope at the photographic laboratory. In this way, a plurality of "customer orders" are collected at end of the photo shops. A plurality of photo shops exist, each of which collect a plurality of customer orders. Each photo shop forwards the customer orders to a photographic laboratory (centralised organisation). At this photographic laboratory, each order is processed by processing the customer order (e.g. film) of tile order according to the processing information (e,g. notes, bar codes, etc.) of the order. For instance, in the prior art (see EP 0 952 487, the disclosure of which is hereby incorporated by reference), a photographic laboratory executes the following processes on a customer order:

receiving the customer order comprising e g. the work envelope of the photo shop and the film cartridge within the work envelope, and processing information, said order including e g. notes which describe the processes to he performed with the film negatives of the customer order, transport arid customer address etc.;

removing the film cartridge from the work envelope;

pulling the exposed film out of its enclosure in the cartridge;

marking the work envelope and the exposed film by a suitable work code (e.g. bar code or the like);

joining together the films of different customer order's thus marked to provide a film negative batch;

developing the batch of films which have been joined together, thus obtaining hatch of negatives, wherein different portions of said batch belong to different customer orders and thus to different processing information;

printing the successive photographs disposed in the batch on a web of photo graphic paper, different portions of said hatch belonging to different customer orders;

distinguishing between the prints of each customer order by applying a work code (e.g. bar code) to the prints, which refers to the corresponding negatives;

cutting the negatives of each customer order into film sections, those film sections including a number of images, according to the number of photographs deter mined in the processing information belonging to the same customer order;

cutting the prints of each customer order, one by one, from the web of prints and stacking them so as to form the stack of prints associated with this customer order;

inserting sections of negatives and the stack of prints assigned to the same customer order into an appropriate flexible pocket-type envelope (a wallet);

adding any supplements like promotion coupons, mini-albums, floppy disks, CDs etc, assigned to the customer order, to the pocket-type envelope or wallet as signed to the same customer order;

closing the pocket-type envelope and placing it in the work envelope (assigned to the san customer order;

closing the work envelope and applying a price label which corresponds to tire customer order treated;

sending the work envelope and thus the processed customer order back to the shop from which it was dispatched, for delivery to the customer.

All above-mentioned processes represent examples of processes on customer orders within the scope of the present invention. The above processes may be performed automatically by processing devices or semi-automatically with the assistance of operators or manually by operators.

A photographic laboratory, in general, serves a wide area with a large number of photo shops and, therefore, must be fitted out for processing (handling) a large number of orders (up to ten thousands various orders a day). This has been made possible only by a high degree of automation in the laboratory itself, with a consistent necessity to standardise the components used (print format, envelopes etc.). A drawback of this standardisation is that individual wishes or information of the customer may not be fulfilled. On the other hand, if a photographic laboratory is designed to fulfil a variety of wishes of a customer, i e. a variety of processing information, the photo graphic laboratory must have a huge number of different processing devices which have to perform the individual orders automatically. Since, however, some individual orders are only rarely desired, the particular processing devices assigned to performing the processes according to those individual wishes or instructions, are only rarely used and therefore not profitable Furthermore, the individual wishes of customers can change due to a change of fashion.

SUMMARY OF THE INVENTION

It is an object of the present invention to provide a method for processing customer orders in a photographic laboratory which provides a high throughput of customer orders and enables the photographic laboratory to fulfil the particular wishes or instructions of customers or photo shops. In addition a processing system for a photographic laboratory shall be provided which solves this object. Finally, a program performing the method of the invention and program product comprising said program shall be provided.

According to the present invention, customer orders, e.g. film cartridges, memories of digital cameras, orders via internet or the like, are received in a processing system provided at the photographic laboratory. Such a processing system may comprise a plurality of processing devices. For instance, a processing device may be a splicer for splicing together films to achieve a film batch, a printer for printing photographs on photographic paper, a developer for developing photographic film, a cutter for cutting a film web or print web, a packing device for packing items, e.g. prints into a wallet or work envelope, a work station or computer which receives digital photographic data together with the processing orders via a network, e.g. LAN or internet. The processing system may further comprise a conveying means, in particular a conveying belt, on which pallets are conveyed. The processing system may comprise supplement supplying means which, for example, supply supplements like CDs, mini-albums etc. to a pallet on a conveyer. The processing system may comprise work stations for digitally processing the image data, laser printers digital micro mirror devices or usual printers for printing the image data or work stations for transmitting the processed image data to a photo shop and so on. In the case, the photographic data or image data are received via network, the customer order may be a block of digital data including the digital image data representing the pictures taken by the customer and a digital header to the digital image data representing the processing information, both together representing a customer order.

A customer order consists of a film cartridge and an assigned processing order. The processing information defines in which way the film cartridge is to be processed. As stated above, the film in the cartridge is related to a work envelope and a film cartridge at the beginning of processing. During processing, the condition of the customer order is changing, the film is developed and prints are added to the customer order. Furthermore, other elements (supplements) may be added to the customer order, like CDs or wallets etc.

The processing system of the present invention may perform all kinds of processing usually performed at a photographic laboratory or may perform only a part of this according to the present invention. In particular, the processing system may comprise all kinds of processing devices, starting from the unpacking of a work envelope received in a photo laboratory and reading the order attached to the working envelope, to packing the finally processed customer order into a package. The processing system of the present invention may also be restricted to a part of the process. In particular, the processing system may be restricted to the cutting of print webs and film webs and the sorting and final packaging of the developed film and the prints. If the processing system of the present invention is, for example, restricted to this part of the process, the customer orders are, for example, received in the form of print webs and film webs. Furthermore, the processing information is already digitalised and received in a digital controller (computer) of the processing system. This digital controller may be a work station or a computer which controls the processing devices of the processing system.

It is preferred to assign match codes, e.g. bar codes, to the elements of a customer order, i.e. the film section, the print section, the envelope, and/or the like before or just after entering one or each of the processing devices of the processing system according to the invention. This can be done to be able to assign the elements of a customer order to each other with respect to particular processing devices. The matching operation, itself can be accomplished by a centralised computer which coordinates the processing of each of the customer orders in compliance with the respective assigned processing information, e.g. instructions imposed by the customer and/or the photo shop.

Usually the processing of customer orders is organised in a sequence of processing steps. In order to control the processing, the controller may, for instance, monitor at which processing step each customer order is present. If, for example, the customer order comprises digitalised image data, the controlling of the processing of the digital data is performed by incorporating the photographic processing program into an overall controlling program. If the customer order comprises conventional films and prints and if thus the customer orders are processed physically and not digitally, usually marks (work codes) are provided on the physical elements of the customer order, i.e. by providing marks (e.g. bar code) on the margin of the prints (web of prints) or film. These marks are read by detectors in order to monitor the location of the customer orders (prints, film section) within the processing system and/or in order to control the processing.

The controlling means of the processing system may be organised centrally or decentrally. If the controlling means is organised centrally, it is preferred to identify a customer order and its location in the processing sequence and to transmit this information to the central processing means. Based on this information, the controlling means controls the processing devices of the processing system in order to execute the next processing step on the particular customer order in accordance with the processing information or instructions assigned to the customer order. Preferably, there are memory means where the processing information are stored, said memory means being accessed by the controlling means.

If the controlling means is organised decentrally, preferably, each processing device of the processing system has its own controller. This controller checks the marks on the customer order (e.g. web of prints) which the processing device has to process. In this case, the marks additionally can comprise instructions which are read by the controller of the processing device. The controller of the processing device then controls the processing device in order to perform the instructions. For instance, the instructions may describe the format into which the web of prints has to be cut, i.e. the format of each single print. Finally, a central controller may cooperate and communicate with decentral controllers.

The above described processing system has the drawback that it may only process the customer orders according to a number of predetermined instructions which may be automatically executed by the devices of the processing system. Therefore only those customer orders may be supplied to the processing system, the sequence of which comply with the predetermined instructions.

It is a major advantage of the processing system of the present invention that it also accepts customer orders with processing information which define instructions which may not be automatically processed by the processing system. In this way a continuous processing of the customer orders is still possible, even if some of the instructions of the processing information cannot automatically be processed by the processing system, i.e. not without the assistance of an operator.

The advantage is accomplished by checking each processing information to ascertain whether or not the processing information may be automatically processed by the processing system. Checking may be performed by the controlling means of the processing system. In this application, the term "automatically processing" means that a customer order may be processed without the assistance of an operator, i.e. automatically by a processing device. An example of "automatically processing" is packing prints automatically into an envelope by a packing machine without the help of an operator or cutting the prints by an automatic cutting machine and not manually by means of an operator. Thus, automatical processing is performed by the processing system (e.g. by a device or machine of the processing system) without the assistance of an operator.

Preferably checking of the processing information is performed by analysing the instructions enclosed or included in the processing information and the processing tasks they imply, as stated in further detail later on.

Since, according to the present invention, the processing information are assigned to their corresponding customer orders, based on said checking, it is possible to identify those customer orders in the processing system which are to be processed according to a processing information which is not (fully) automatically processable. This allows acceptance of those customer orders in the processing system since, due to their identification as non-automatically processable, they may be treated differently than the other customer orders.

For instance, at least one of the following processes or treatments may be performed if a non-automatically processable order has been identified:

- a warning signal may be issued which identifies the customer order. In this way the customer order may be separated from the processing line and further processed by means of an operator;
- the customer order may be automatically separated and conveyed to a processing site where it is semi-automatically or manually processed;
- a label may be attached to the customer order which describes the instruction to be performed semi-automatically or manually.

In summary, the checking of the processing information for automatically processability and the identification of the non-automatically processable orders allow for an integration of the semi-automatically or manually processing of those units in the automatic processing of the remaining orders.

A particular advantage of the present invention is that the automatically processing capabilities may be used as far as possible or appropriate in those cases in which at least one instruction of the processing information is automatically processable.

If, for example, the processing information comprises automatically processable instructions concerning the formats of the prints and thus the cutting of the web of prints, but also comprises particular instructions concerning the addition of supplements to customer orders, a huge part of the order may be processed automatically. The prints may he processed and cut in the desired formats the cut prints and the corresponding section of Film may be supplied to a pallet assigned to the order and conveyed on a conveyer. Furthermore, a supplement may he added to another tray of the pallet. However, if the pallet arrives at the packing machine (which is also part of the processing system), the packing machine is not able to pack the supplement automatically in a envelope. The processing system of the present invention solves this problem since the processing system checks the information or instructions and recognizes that the adding of a supplement results in that the packing machine is not capable of automatically packing all parts of tire customer order into an envelope. The processing system identifies the customer order which comprises for instance at this stage of processing a pallet, the prints, the film section and the supplement. This identification allows for a different treatment of the identified customer order. For instance, the identified pallet may he conveyed to a packing site where the film, the prints and the supplement are packed into a suitable envelope by an operator. After packing the package (envelope), the package is re fed to the automatic processing line which conveys the packages (envelopes) to a shipping station, Furthermore, the (empty) pallet is separated from the customer order and re fed to a conveyor belt for reuse in the processing system, i.e. the pallet may be refilled by other prints, films and supplements of a different customer order. A processing system of the present invention may comprise a processing line, where a number of processes is performed on the customer order in a sequence. The "automatic part" of said processing line, i.e. the automatic processing line, comprises devices which automatically process the customer order.

For checking the instructions of an order, to ascertain whether the instructions are automatically processable or not by the processing system, the controlling means of the processing system preferably accesses a memory means. A list of processable instructions and/or sequences of processable instructions is preferably stored in the memory means. The controlling means compares the instructions of a processing information with the stored instructions or sequences of instructions. Based on this, the controlling means decides and assesses whether the processing information for a related customer order is automatically processable or not. Furthermore the controlling means advantageously decides which instructions of the processing information should be performed automatically and at which stage of the processing the corresponding customer order should be separated from that portion or those portions of a processing line assigned to the automatic processing, and which should be semi-automatically or manually processed.

Advantageously, the identified customer order or elements thereof, like a negative film, web of print, CD, envelope, wallet etc., are automatically conveyed to a semi-automatically or manually processing site. At this processing site, the customer order or element thereof is processed by means of an operator or group of operators. Advantageously, there is provided a number of, or a plurality of, processing sites, wherein each processing site is assigned to a number of particular processing tasks. Preferably, the controlling means decides which one of the processing sites is best suitable to perform the processing tasks (instructions). Advantageously, for this purpose, an allocation table is stored in the memory means. This allocation table locates processing tasks (to the performed instructions) to different processing sites. If an instruction which is not automatically processable defines a particular processing task, the controlling means accesses the allocation table and decides based on the allocation table to which of the sites the corresponding customer order or element thereof should be passed. The term "passing" may mean "conveying" if physical elements like prints are concerned, or "transmitting" if digital data like photographic data are concerned.

Different levels of difficulty may be assigned to at least some of the different processing sites, each processing site of a particular level of difficulty may process processing tasks of the same or lower difficulty level. In this way, an optimum usage of the available processing sites and the skills of the operators at those processing sites is possible. Preferably, a customer order to be processed at a processing site is conveyed to that processing site having the lowest possible difficulty level which is still able to execute the required instructions.

Additionally or alternatively the processing tasks may be categorised in categories based on the kind of processing to be performed, e.g. cutting, packing, image processing etc. A category is assigned to a processing site. The controlling means ascertains to which category the different processing tasks defined by a processing information belong and passes the corresponding customer order to the suitable processing site. The allocation of a category to processing tasks and to processing sites may be stored in a memory accessable by the controlling means. The categorisation of processing tasks fosters the modular structure of the processing system of the present invention and may also be applied to automatic processing devices by assigning a category to an automatic processing site. In particular automatic processing devices and semi-automatic processing sites belonging to the same category (e.g. packing) may be locally grouped to reduce the transportation distances of the customer orders and to facilitate replacement of processing sites by automatic processing devices, the replacement of automatic processing devices and/or the update of control programs for the processing devices.

Preferably, the processing system of the present invention is also used for quality control and quality management. For example, detectors (e.g. cameras) may monitor whether the elements of a customer order are properly processed. For instance, it may be monitored whether the quality of the cutting of prints or the quality of packing the prints in an envelope is sufficient. If an error or unacceptable quality is detected, the corresponding customer orders may be identified by the controlling means and conveyed to an appropriate processing site, e.g. staffed with a quality expert, which may handle the error or quality defect.

Advantageously, the method of the present invention for processing customer orders according to their corresponding processing information is performed by means of or with the assistance of a program which runs on a computer, work station etc., which controls the processing system.

The present invention further relates to a computer program product, like a storing medium for storing a computer program, which stores the above-mentioned program. A storing medium may be a CD, a DVD, a floppy disk etc. The present invention also covers the provision of the program via internet.

BRIEF DESCRIPTION OF THE DRAWINGS

Other objects and advantages of the present invention will become more apparent from the following detailed description of preferred embodiments, when read in conjunction with the accompanying drawings wherein like elements have been represented by like reference numerals and wherein.

DETAILED DESCRIPTION OF THE PREFERRED EMBODIMENTS

Figure 1:
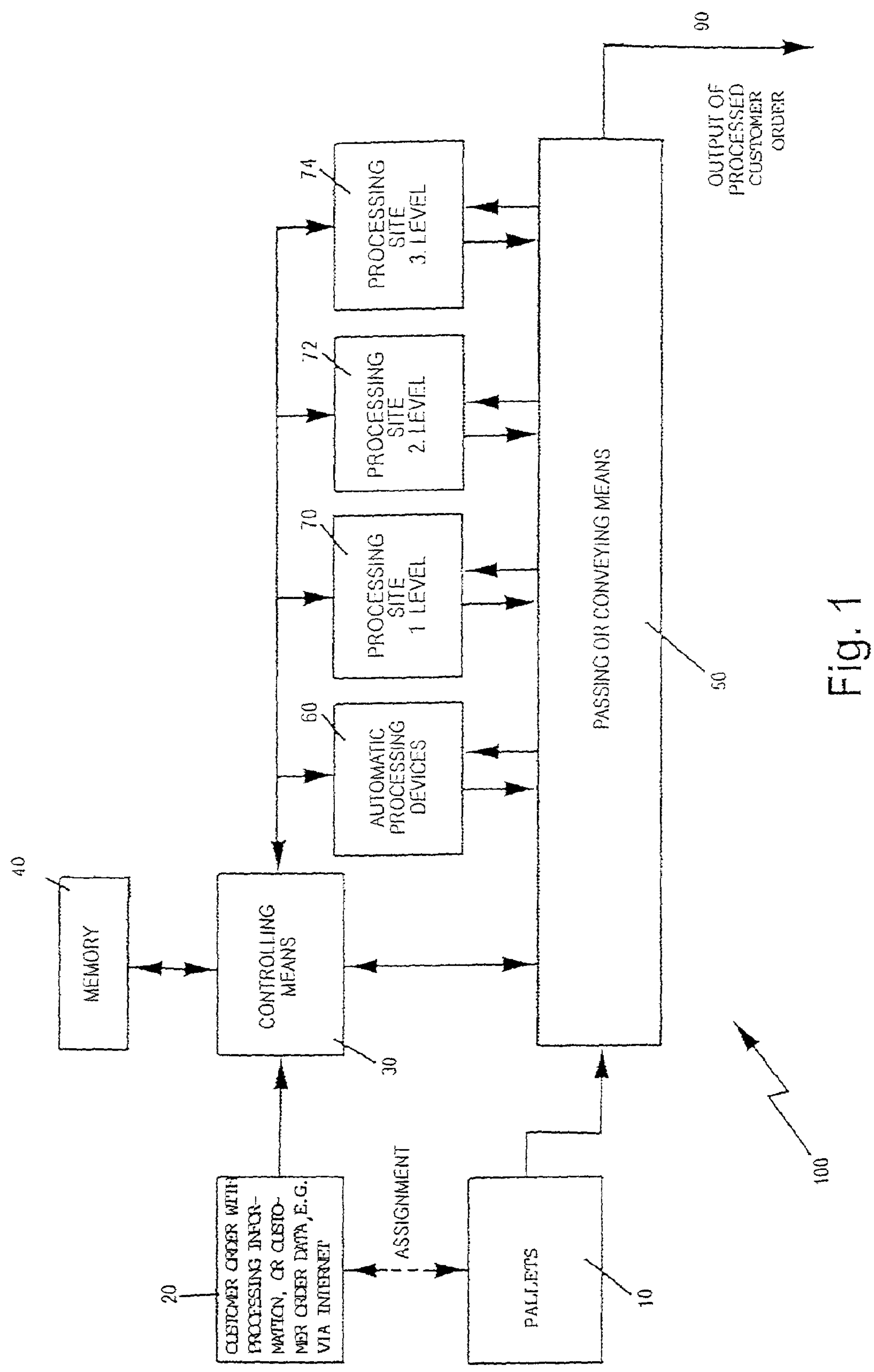
FIG. 1 is a schematic diagram of a processing system according to the present invention.

As shown in FIG. 1, customer orders 20 are supplied to a processing system 100. To each customer order, a processing order is assigned. The processing information describes in which way the customer order has to be processed by the processing system 100. In the system, elements of a customer order which are processed are directed to pallets 10. These pallets 10 can be recognised on the basis of some marks, or match codes e.g. a bar code and thus one particular pallet can be related with one particular customer order 20. During processing of said particular customer order 20 in accordance with the processing information, the movement as well as the progress of this customer order can be monitored on the basis of the marks which are assigned to said particular pallet 10.

The processing system 100 comprises controlling means 30, a memory 40, automatically processing devices 60, semi-automatic processing sites 70, and passing or conveying means 50.

The customer order 20 may be in a partially processed state when they enter the processing system at the input 11. Furthermore the customer order can already be completely processed when they leave the processing system 100 at the output 90, however an incomplete processing by the processing system is also within the scope of the present application.

Figure 2:
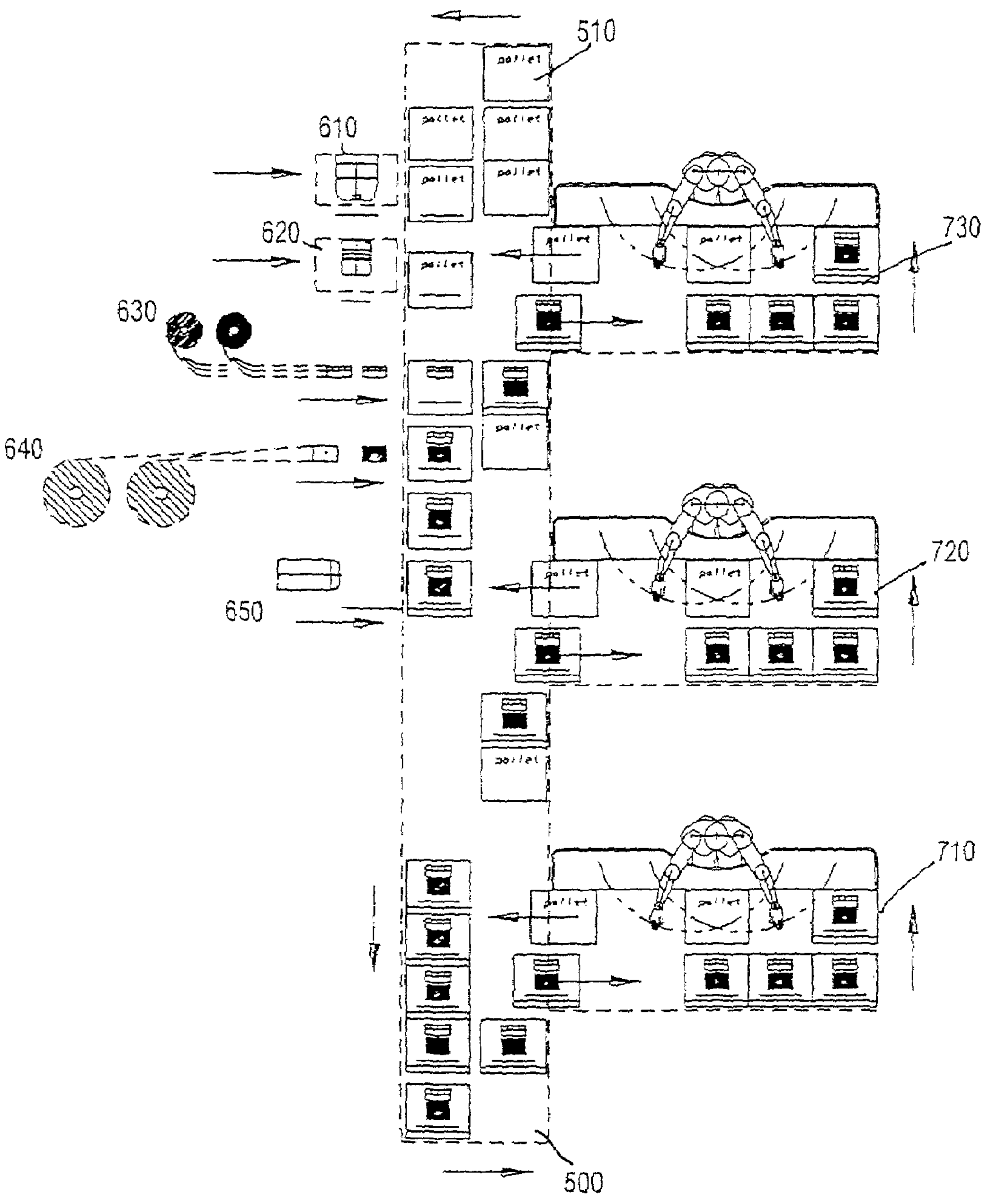
FIG. 2 is a schematic diagram of a processing system according to the present invention.

The customer order which enters the processing system at the input may be, for example, in the form of a working envelope comprising a film cartridge with a negative film therein. If the customer order is already partially processed, the customer order may comprise separate elements when entering the processing system 100. For instance, the customer order may consist of a sequence of prints on a web of prints and a sequence of negative images (pictures) incorporated in a film web. FIG. 2, which will be discussed below, pertains to the case when a film web and a print web enter the processing system.

The processing information may be simply input in the processing system at the input of the controlling means 30 by means of an operator, who reads the information and inputs them using a keyboard and an input assisting application program into a computer linked with the processing system. Alternatively, automatic reading of processing sheets may be used. If the processing system relates to processing of already partially processed customer orders, preferably, the processing information are already digitalised and provided to the controlling means. A further alternative or additional option is that the customer orders comprise marks (bar codes) which are read by detectors, sensors or the like. These marks can represent the processing information which are read by detectors or sensors in order to supply them to the controlling means, i.e. to the central controlling means 30 and/or to controlling means of the individual automatic processing devices 60 and/or to the semi-automatic processing sites 70. At the semi-automatic processing sites 70, the current processing order to be processed by an operator on the current customer order may be displayed on a screen. In front of or in each of said device 60, it is preferred to provide the elements of each of said customer orders with a particular matching code. The actual place where an element of a customer order is present can be monitored, and the elements of a customer order, e.g. the assigned film portion(s), print portion(s), envelope and the like, can be assigned to each other. Also each pallet 10 assigned to one ode or the like to monitor and control the processing of the assigned customer orders in progress and the elements assigned to those customer orders. A central control device, e.g. a computer and/or a server can control the matching operations and can assign the processing information to the particular customer orders and/or the particular processing devices 60 of the overall system 100, preferably in accordance with the assigned matching codes related to the corresponding customer order and/or its elements.

Finally the processing information and the image data may be received entirely digitally, e.g. via internet. In this case, a customer order may consist of the digitalised image (picture) data and a header representing the processing information.

When the customer orders are received in the processing system, they are conveyed by means of a conveying means (e.g. endless belt). The conveying means, for example, conveys the customer order (e.g. a print web and a film web) to automatic processing devices (e.g. a cutter for the film web and a cutter for the print web). The automatic processing devices perform instructions on the print unit (film web, print web). For instance, the film web and the print web are cut into formats according to the instructions. The instructions are provided either centrally by the control means which monitors the location of the customer order and/or by detecting the marks on the margin of the print web or film web.

If the customer order is digital photographic data i.e. image data, an automatic processing device may be an image processing device which analyses the images, performs color corrections and/or prints the images, e.g. by means of a laser printer.

According to one embodiment of the present invention, automatic processed elements of a customer order are fed on pallets 10 which are conveyed by the conveying means. Other automatic processing devices (dispenser) supplement additional items to a customer order, e.g. wallets, envelopes or CDs.

According to one embodiment of the present invention, a memory 40 stores instructions which are automatically processable by the automatically processing devices. The controlling means 30 checks by accessing the memory 40 whether the instructions of a particular order are automatically processable. If some of the instructions are not automatically processable, the corresponding photographic unit is fed via the conveying means to a semi-automatically processing site 70.

If, for example, an automatically processing device is a device for packing the different elements of a customer order into a envelope and the standard envelope is too small for items to be packed in the envelope, the controlling means conveys the elements of the customer order to a site (semi-automatic processing site or manual processing site) where the elements are packed by an operator into a larger envelope. The larger envelope is then conveyed back to the conveying means 40 in order to convey the envelope further for shipping.

If, for example, the customer orders are received as digital data, a particular non-automatically processable instruction may be to combine different, separate pictures to one large panoramic picture. In this case the photographic data are passed (transmitted) to a semi-automatic processing site where an operator performs the combining on a work station by means of an application program and a computer. The operator is particularly skilled for performing the combination of the different pictures to one large panoramic picture. Afterwards, the processed data package representing the enlarged panoramic picture is passed (transmitted) back to the passing means 50. For instance, the passing means (transmitting means) 50 then passes (transmits) the corresponding data package to an automatic processing device 60, e.g. a laser printer, where the enlarged panoramic picture is printed.

In summary, the passing or conveying means 50 shown in FIG. 1 may be a conveying means for conveying physically customer orders, like prints or envelopes, or may comprise both kinds of passing means.

A particular advantage of the present invention is that the processing system has a flexible design, i.e. modules may be added to the processing system or removed in a flexible way. It is only necessary to update the memory about the instructions which may be performed automatically and about the capabilities of the different automatic processing devices and semi-automatic processing sites. If, for example, a new processing device 80 is added to the processing system which may, for example, produce CDs based on photographic data of a customer order, this new device 80 may be integrated into the new processing system 100, while the controlling program stored in the memory 40 may be simply updated in view of the new processing device.

FIG. 2 shows a further particular example of a processing system according to the present invention. A processing system according to the present invention may comprise, for instance, a standard HS print line, a print dual batch loader, a standard HS film line, a film dual batch loader, an index print feeder, a poly feeder, a dispenser for CDs, mini-albums and various other items.

A print dual batch loader and also a film dual batch loader, as referred to above are each a system for supplying the print or film web to a corresponding cutter in a continuous way. This device gives the possibility to load two rolls of prints or film. If the first roll is finished, the trailing edge of the first is automatically spliced to the leading edge of the second. The advantage is that the presence of the operator is not necessary in the precise moment when the first roll ends, he can load the next roll in any moment during the process of the previous roll. A roll can be an entire batch or part of a multi-roll batch.

A HS print line usually is a high speed print line which is composed of a print cutter which performs the following functions and steps. First, the prints are cut using the punch marks as a reference and contiguous orders are separated. Then the photographic order or customer order is identified by reading its matching code. The matching code is an information used by the system controlling software to assign the prints to the rest of the order. The identification is done by decoding the positions left/right of the punch marks. Afterwards the format of every print is identified and the print belonging to the current order is identified and are counted by format. Furthermore, quality marks for separation of reject/remake prints are recognised. A print sorter is operated to separate the prints, according to their print length (if more than one format is present in the order) and quality (quality marking). A print buffer provides the possibility to stack the prints output by the sorter in different levels, according to their format. About five different compartments are provided. In case of APS orders starting from the uppermost, the compartments are assigned to index prints, classic format prints, HDTV format prints, panorama formal prints and remake prints of any format.

The print buffer has a variable width being determined by controlling software to match to the print width. The compartments or slots have different lengths determined by bumpers which preferable are adjustable obstacles. These bumper devices or stoppers have the function to achieve a good alignment of prints, the ease the subsequent introduction into the wallet or envelope, manually or automatically.

The prints, when the cutting of the order is completed, are buffered at once. To achieve a correct dropping also of index prints, that may be longer than the classic format, the bumper of the classic format besides its normal position adjustment performed together with the other stoppers. Allows for a further movement, for instance a retraction, accomplished only when the print dropping is performed. A print handler is to align the prints laterally to remove the print stack from the buffer are, and to modify their orientation according to the needs of the next functional unit, e.g. the pallet interface or the automatic wallet packaging. These are the components of the HS print line.

A HS or High Speed film line includes a film cutter, a film stacker and a film handler. The film cutter is to cut the film in film sections, and to separate contiguous orders; the photographic order are identified by reading it matching code, i.e. the information used by the system controlling software to match the film with the rest of the customer order; the identification is done by decoding a bar code or the like printed on the film splice portion.

The film stacker is to stack the film sections avoiding the contact between film section during the superimposition to suppress scratching of the film negatives. The width of film stacker is automatically adjusted, under the control of system software, according to the film type and the presence of a tab. The tab is a paper web applied to the side of the film. The automatic adjustment can also be realised on the basis of a reorder web paper web applied to the side of the film, the keep together film sections of a film already cut during a previous processing.

The film section, when the cutting of the order is completed, are buffered at once.

The film handler is places to receive the entire film cut in sections from the stacker, and to modify it orientation according to the needs of the next functional unit e.g. the pallet interface or automatic wallet packaging.

Finally, a polyfeeder is a multi-way dispenser for advertising materials such as single sheets, folded sheets, booklets or other flat materials. The polyfeeder, under the control of system software, is able to collate a set of objects that may vary order by order according to data, e.g. said processing information, provided by the customer and/or the photo shop.

An example of a processing system is shown in FIG. 2. As automatic processing devices, the processing system comprises a wallet feeder 610 for large wallets and a wallet feeder 620 for small wallets. The wallets are meant to be filled with the cut prints and film. Furthermore provided as an automatically processing device is a cutter to cut a film web in suitable formats in accordance with the processing information. In addition a cutter 640 for a print map is provided as an automatically processing device, The film web and the print web represent a sequence of customer orders received in the processing system shown in FIG. 2. Another automatically processing device is the envelope feeder 650.

On a conveying means 500, pallets 510 are transported, e.g. in a circular way.

A pallet 510 is preferably assigned to a processing information. Preferably, the pallet is marked, e.g. by a bar code. In this way, the assignment of a pallet to a processing information may be controlled during conveyance of the pallet. The pallet is filled with a large wallet by the wallet feeder 610 or a small wallet by the wallet feeder 620, depending on the processing information to which the pallet is assigned. Thereafter, the section of the negative film web, which is assigned to the processing information, is supplied to the pallet. Subsequently the corresponding prints assigned to the same processing order are fed to the same pallet by the cutter 640. In a last step, a corresponding envelope 650 is fed into a tray of the pallet. At this stage, the pallet and all items in the pallet represent a nearly finished customer order. If the controlling means assesses that the photographic unit may be processed by an automatic packing machine (not shown), the customer order may be conveyed to the packing machine. Otherwise, the pallet is conveyed to one of the semi-automatic processing sites 710, 720 or 730, where the different items in the pallets are packed by an operator. The operator may put back the packed finished customer order to the conveying means 500 for further conveyance to a location where the packages are prepared for shipping.

The pallets 510 are assigned to a particular processing information. After the pallet has been filled by different items, some processing instructions still have to be performed with the items and/or the pallet, in particular packing the items into the wallet or still performing some cutting tasks. The controlling means decides, based on the above-mentioned allocation table, which one of the processing sites 710, 720 and 730, e.g. the corresponding operator, has the appropriate difficulty level for the remaining processing tasks. When the controlling system has determined the appropriate processing site, the controlling system controls the conveying means 500 such that the corresponding pallet is conveyed to the processing site with the appropriate difficulty level. If processing tasks of another difficulty level remains to be executed, the customer order is conveyed to a next processing site of appropriate difficulty level.

It is also possible to convey all orders, which cannot be automatically processed to an intermediate storage at first, if the processing sites are inactive or no operators are present at the sited 710, 720, 730. When the sited are active later, all the orders collected in the intermediate storage can be send to the sited to be finished.

Figure 6:
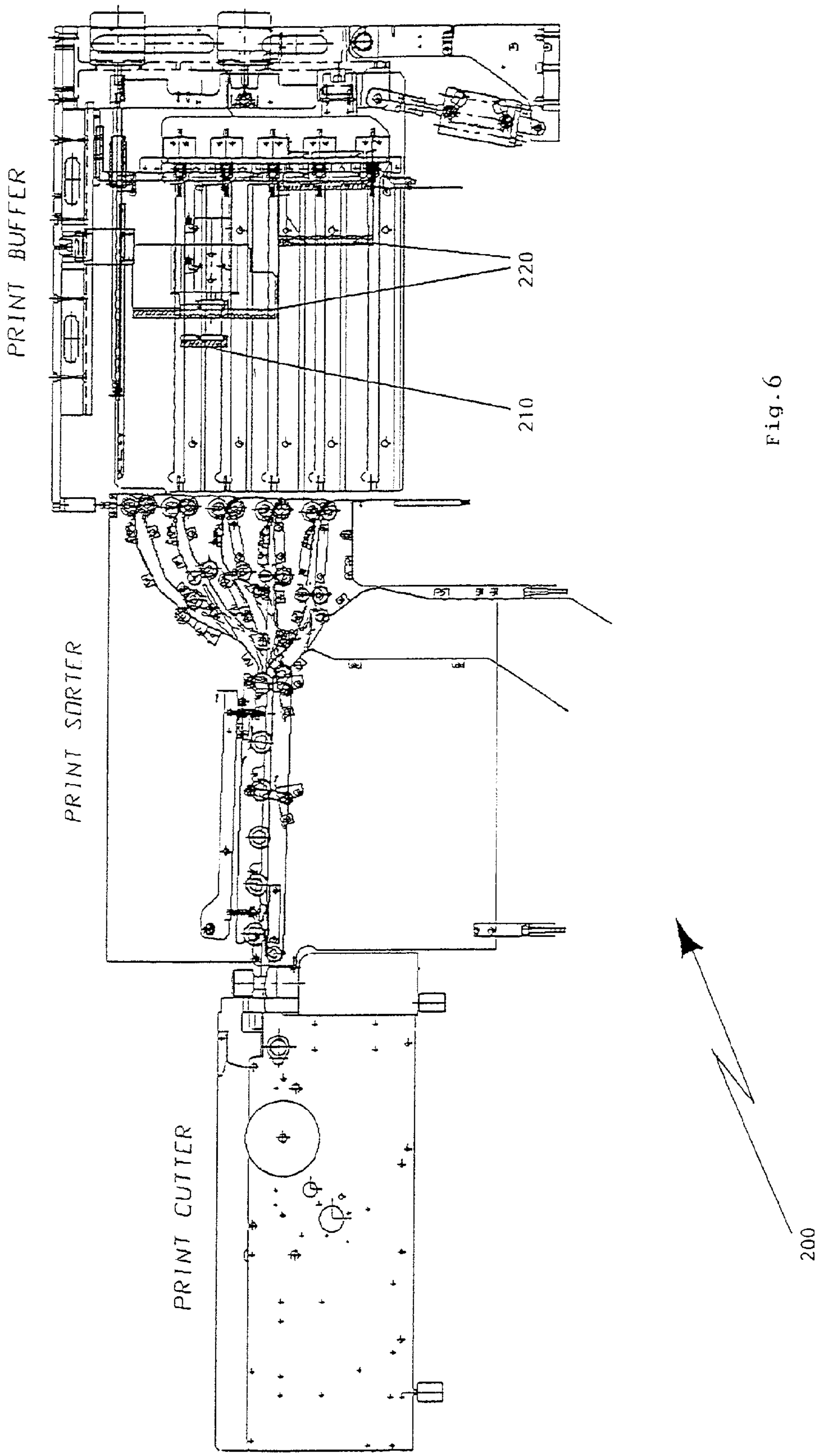
FIG. 6 shows a longitudinal crossection of a processing apparatus which can be applied in accordance with the invention.

The processing system of the present invention particularly comprises a processing device 200 mentioned in FIG. 6 including the following sections:

cutting means or a print cutter for cutting a portion of web of photographic prints belonging to one customer order into sections of different length, said sections representing photographic images and/or index prints, sorting means or a print buffer for sorting the sections in different compartments of a print buffer according to their lengths, said compartments being arranged one above the other, releasing means in said print buffer assigned to each compartment for releasing the sections of each compartment such that they fall due to gravity down onto a collecting means which collects the released sections ordered according to their length, wherein the uppermost compartment is provided for index prints which can have larger dimensions than the smaller prints in the penultimate uppermost compartment, so that bumping means provided for stopping said small dimension prints have to be withdrawn, such that the index print or index prints can fall on top of the collected pile of prints when said index print is released. The bumping means 220 for other print dimensions usually are rigid and cannot be moved.

Figure 3:
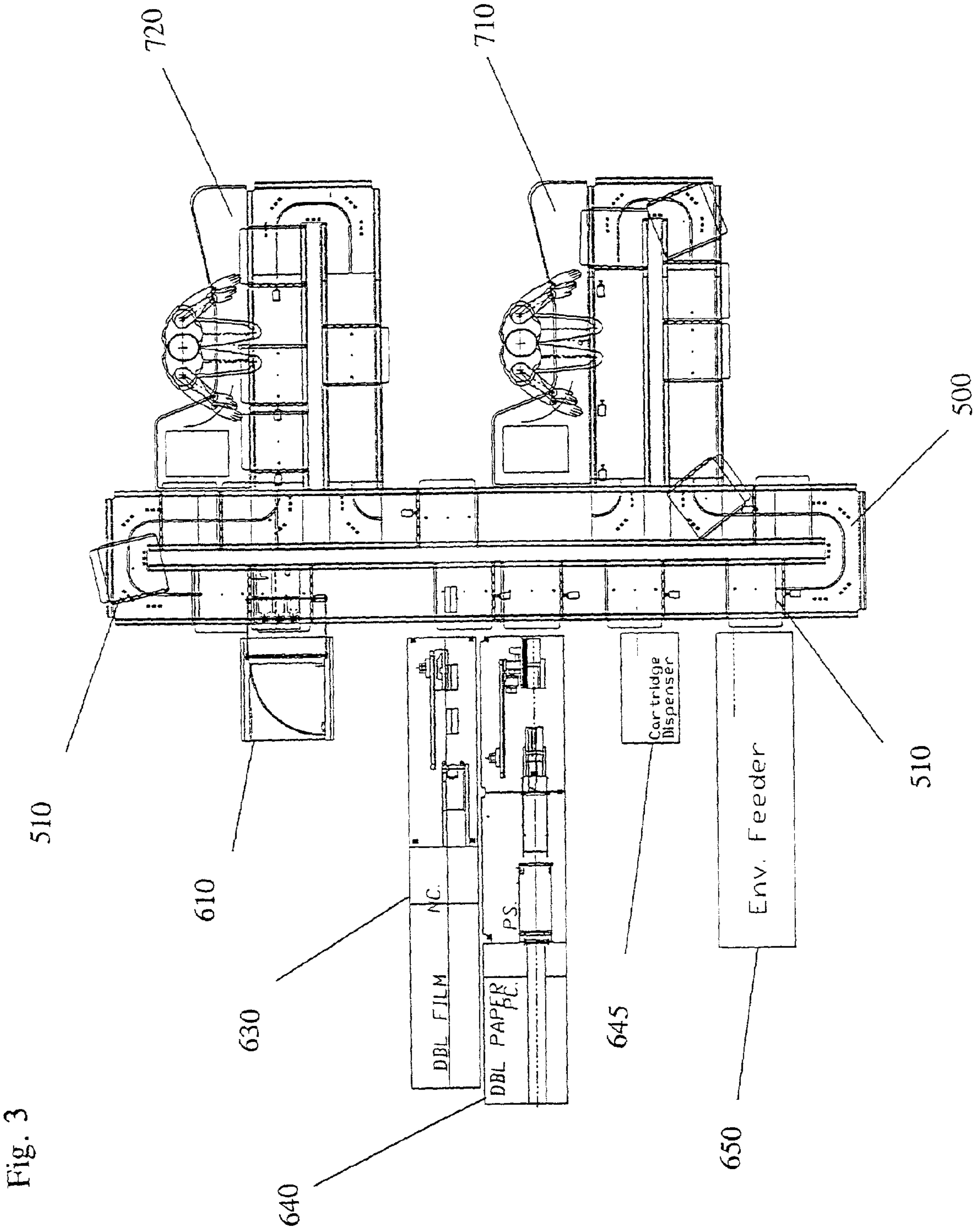
FIG. 3 is a schematic diagram of a further embodiment in accordance with the invention.

FIG. 3 shows a further schematic view of another embodiment of the invention. The same reference numbers concern the same parts or devices as in FIG. 2. The same applies to FIGS. 4 and 5. Accordingly, those parts or devices which are discussed with reference to FIG. 2 will not be described again with reference to FIGS. 3 to 5.

In FIG. 3, in addition to FIG. 2, a device 645 is available, which serves to supply different kinds of additional items, e.g. CDs, advertisement materials, index prints or similar.

The embodiment of FIG. 3 has a rather low level of automatisation and, accordingly, needs at least one operator 710 or 720 with very high level skills. On the other hand, this embodiment is very flexible, since the very well trained operator is also able to deal with customer orders which are very specific or unique.

The embodiment of FIG. 3 works such that a central computer organising the processing of a huge number or customer orders, identifies such a particular order and the identification code of a pallet 510. From the different devices 610, 630, . . . arranged along the conveyer path 500, in accordance with the identification code of this pallet, which code is in this stage also an identification code for a particular customer order, several items are assigned to this pallet in accordance with the processing information stored by the central computer or lab server which organises the process flow of the customer orders in the photo laboratory. It is also possible to add a further instruction paper with processing information for an operator informing the operator how to treat a specific customer order.

All the items located on the specified pallet 510 after the last device 650 are finally led to one of the operators 710, 720, . . . .

Since the central computer has stored complexity information showing whether a specified customer order positioned on a particular pallet is more or less complicated to deal with, the central computer is able to guide a pallet with a more complicated customer order to an operator with high level skills, e.g. 710, and customer orders which are easy to handle to an operator with low level skills. In accordance with this complexity information, a corresponding switch or guide arrangement in the course of the conveyer device 500 can be activated to guide a corresponding pallet either to the operator 710 or the operator 720 (or another one if existent).

Figure 4:
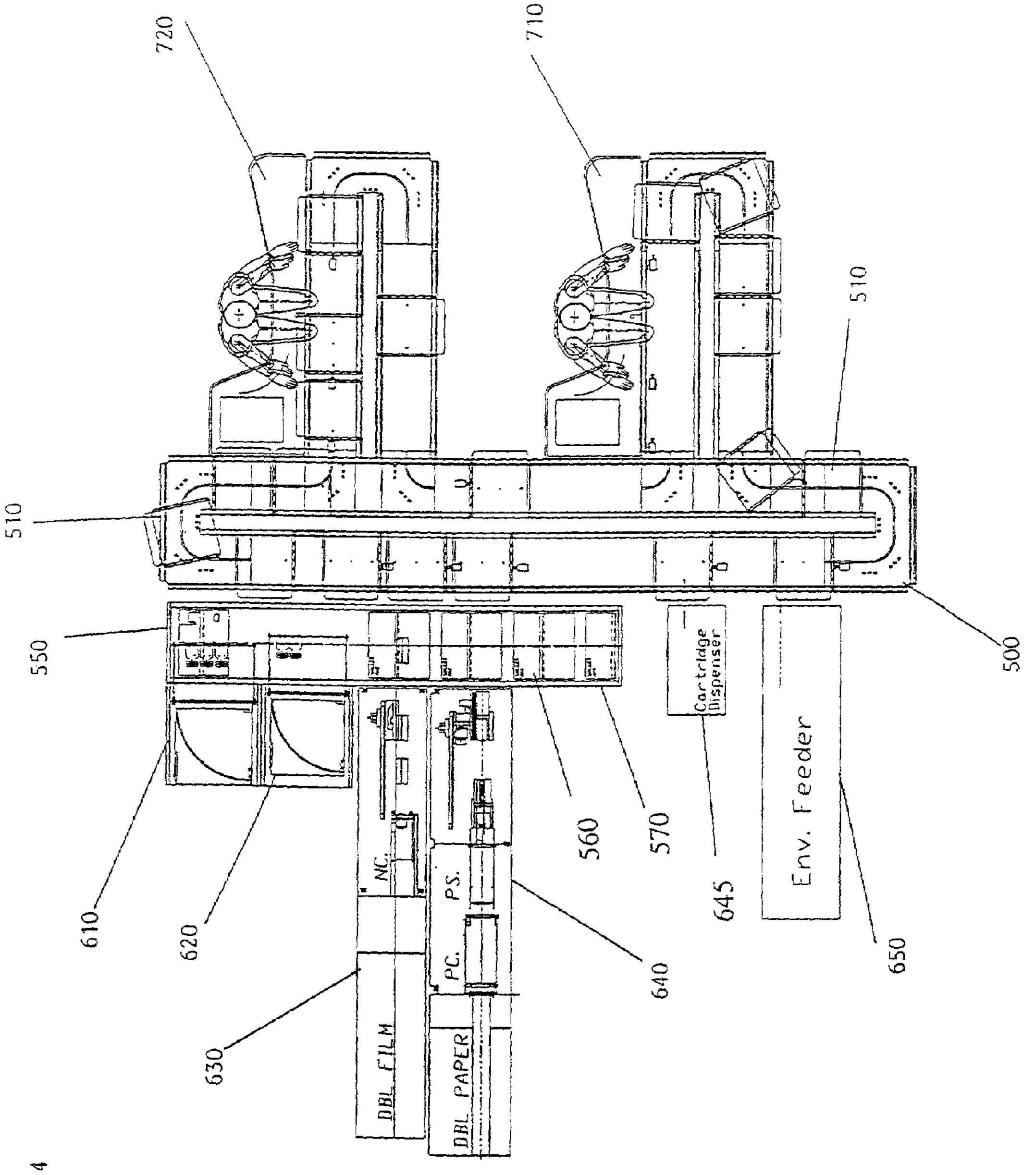
FIG. 4 is a further embodiment in a schematic elevation.

In FIG. 4, an embodiment with a higher level of automatisation is shown. An additional conveyer path 550 is arranged besides the conveyer 500. The devices 610 to 640 are preferably prepared to insert all items related to an automatically processable customer order into one type of wallet which is supplied by either the wallet feeder 610 or the wallet feeder 620. After all items belonging to one customer order are assigned to the corresponding wallet, a completed wallet 560 can be supplied to a customer order storage location 570 to be shipped, e.g. to a photo shop or the customer himself.

If a particular customer order cannot be processed or not completely processed via the additional conveyer path, the items can be handed over to the pallets 510 being transported to operators 710, 720 to be completed. Of course, also the operators 710, 720 can have different levels of skills and the central lab computer can control the switches in front of the operators in accordance with the complexity information related to the pallets 510 and to the corresponding customer orders.

Figure 5:
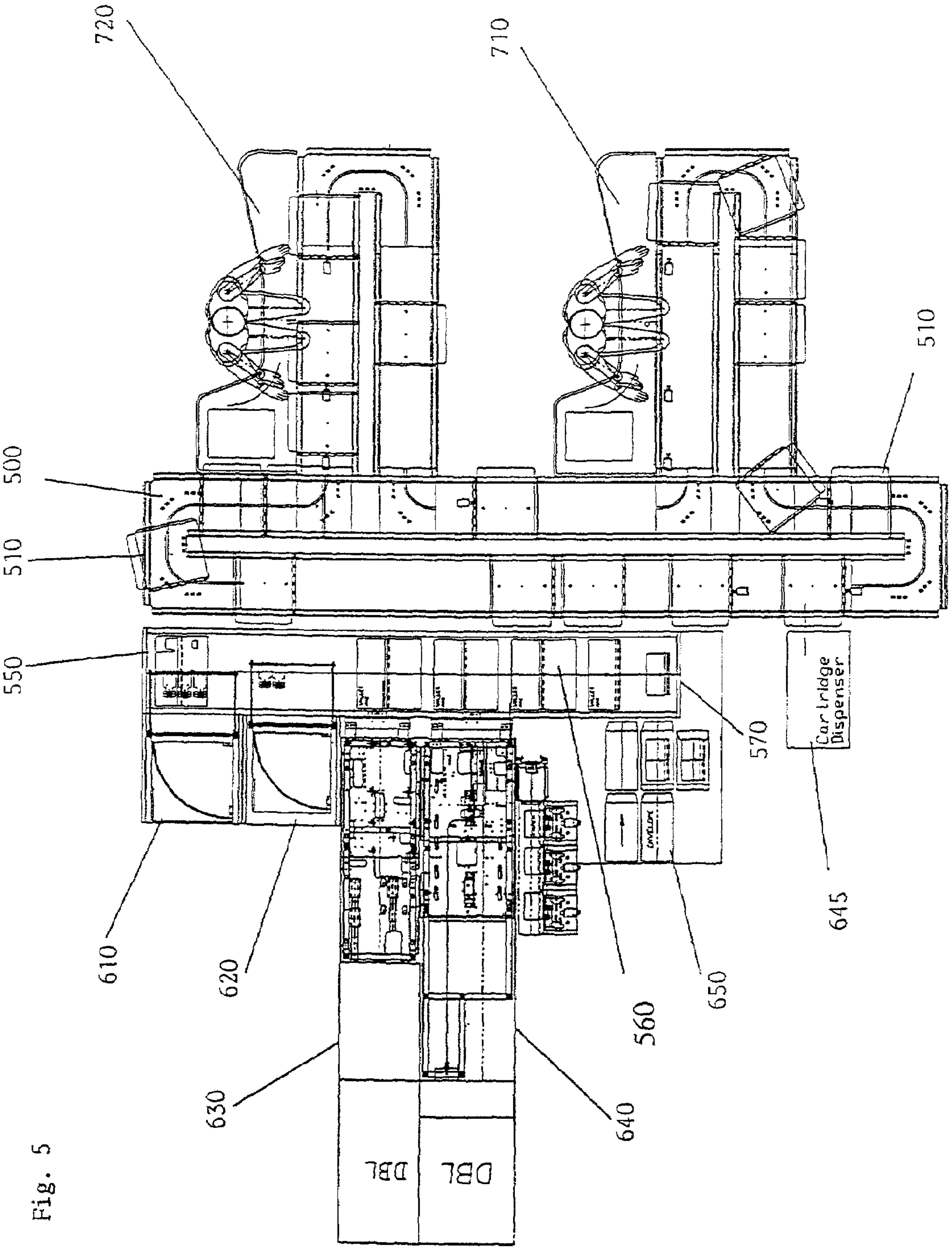
FIG. 5 shows another embodiment of the invention in a schematic overview.

The embodiment according to FIG. 5 has even a higher level of automatisation, in that more of the devices are located in the reach or scope of the additional conveyer path 550 so that additional operations can be covered automatically. In principal, however, also this embodiment works as mentioned above, in particular considering the embodiments of FIGS. 1, 2 and 4.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Method of processing photographs in a photographic laboratory by means of a photographic processing system, comprising the steps of:

receiving customer orders and processing information respectively assigned to said customer orders, each customer order comprising at least one photographic image;

controlling the processing of each customer order in accordance with an assigned processing information;

checking each processing information to ascertain whether or not the processing information can automatically be processed by said processing system; and identifying those customer orders which are to be processed according to a non-automatically processable processing information.

2. Method according to claim 1, wherein said processing information comprise instructions and said checking is performed by comparing the instructions of an order with a stored list of instructions which are automatically executable by said processing system.

3. Method according to claim 1, further comprising the steps of:

issuing a particular signal if a customer order is identified as not being automatically processable;

marking an identified customer order to indicate the non-automatically processability; and at least one of separating the non automatically processable customer order from the customer orders which are automatically processable, and processing the non-automatically processable customer orders with the assistance of at one operator.

4. Method according to claim 1, wherein in the event that a processing information comprises a number of instructions, at least one of which is not automatically processable, comprising the step of:

checking each instruction for whether the instruction may be executed automatically by said processing system without the assistance of an operator and executing at least a part of those automatically executable instructions automatically by said processing system.

5. Method according claim 4, wherein those instructions not automatically executed by the processing system are executed on the customer order by passing the customer order to at least one processing site where the instructions necessary to completely perform the processing information are executed by means of the assistance of at least one operator.

6. Method according to claim 5, wherein a plurality of said processing sites with at least one operator are provided, and wherein said non-automatically executable instructions are analysed with regard to at least one of which of said processing sites and which one of said operators is best suitable to execute a particular non-automatically executable instruction.

7. Method according to claim 5, wherein after automatic processing of the customer orders, the customer orders are checked for errors due to the processing and wherein those customer orders having errors are conveyed to a suitable processing site assigned to the handling of errors.

8. Method according to claim 1, wherein each customer order comprises a film unit of developed photographic film, and a print unit of prints made by printing said photographic images on photo graphic paper;

and wherein each processing information is assigned to a customer order comprising a film unit and a corresponding print unit, said corresponding print unit comprising a number of prints of photographic images of the corresponding film unit.

9. Method according to claim 8, wherein at least one of said photographic film and said prints are received in the form of a web, and wherein one of said plurality of processes performed by said processing system is that of cutting said web in sections, each section assigned to at least one photographic image and the size or format of each section being defined by the assigned order.

10. Method according to claim 9, wherein one of said plurality of processes per formed by the processing system is that of packing developed photographic film and prints into a package, wherein the selection of the film and the prints to he packed in the same package is defined by the assigned processing information.

11. Method according to claim 10, wherein one of said plurality of processes is that of adding supplements to said packages, wherein whether a supplement is to be added or not and the kind of supplement is defined by the processing information as signed to the film and prints in said package.

12. Method according to claim 1, wherein during the process for said customer orders in said processing system, particular match codes are assigned to elements of each said customer order to monitor the progress of said elements of said customer orders and to assign said elements to each other to complete said customer orders.

13. Processing system for processing photographs in a photographic laboratory, comprising:

a receiving unit for receiving customer orders and processing information respectively assigned to those customer orders, each customer order comprising at least one photographic image;

a control means for controlling the processing of a customer order in accordance with an assigned processing information;

a checking means for checking each processing information to ascertain whether or not the processing information may be automatically processed by said processing system without the assistance of an operator; and an identifying means for identifying those customer orders which are to be processed according to a non automatically processable processing information.

14. Processing system according to claim 13, comprising:

a conveying means for conveying pallets along a conveying path; and a number of supplying means for supplying elements of a customer order to a pallet such that a pallet is supplied only with elements of one customer order, wherein said control means assigns each pallet supplied with elements to the processing information corresponding to the photographic unit, to which the elements of the pallet belong, and wherein said control means controls said conveying means such that those pallets, which are assigned to a non-automatically processable order, are separated from that portion of the conveying path which is allocated to automatic processing without the assistance of an operator.

15. Processing system according to claim 13, including a photo material processing device that comprises:

cutting means for cutting a portion of web of photographic prints belonging to one photographic unit into sections of different length, said sections representing at least one of photographic images and index prints;

sorting means for sorting the sections in different compartments according to their lengths, said compartments being arranged one above the other; and releasing means assigned to each compartment for releasing the sections of each compartment such that they fall due to their gravity down onto a collecting means which collects the released sections ordered according to their length, wherein the uppermost compartment is provided for index prints which can have larger dimensions than smaller prints, so that bumping means provided for stopping said small dimension prints have to be withdrawn, such that the index print or index prints can fall onto the collected pile of prints when said index print is released.

16. A program which, when run on a computer which is part of a processing system in a photographic laboratory, or when loaded in said computer causes or is capable of causing the computer to carry out the method as claimed in claim 1 a method of processing photographs in a photographic laboratory by means of a photographic processing system, the method comprising the steps of:

receiving customer orders and processing information respectively assigned to said customer orders, each customer order comprising at least one photographic image;

controlling the processing of each customer order in accordance with an assigned processing information;

checking each processing information to ascertain whether or not the processing information can automatically be processed by said processing system; and identifying those customer orders which are to be processed according to a non-automatically processable processing information.

17. A computer program product comprising a program which, when run on a computer which is part of a processing system in a photographic laboratory, or when loaded in said computer causes or is capable of causing the computer to carry out a method of processing photographs in a photographic laboratory by means of a photographic processing system, the method comprising the steps of:

receiving customer orders and processing information respectively assigned to said customer orders, each customer order comprising at least one photographic image;

controlling the processing of each customer order in accordance with an assigned processing information;

checking each processing information to ascertain whether or not the processing information can automatically be processed by said processing system; and identifying those customer orders which are to be processed according to a non-automatically processable processing information.

* * * * *